United States Patent Office 3,277,187
Patented Oct. 4, 1966

3,277,187
MANUFACTURE OF HALOHYDRINS
Kenneth C. Dewhirst, San Pablo, Calif., assignor to Shell Oil Company, New York, N.Y., a corporation of Delaware
No Drawing. Filed July 13, 1962, Ser. No. 209,798
10 Claims. (Cl. 260—633)

This invention relates to a process for the preparation of useful halohydrin compounds by hydrogenation of halogen-containing carbonyl compounds in the presence of ruthenium.

It is known that hydroxy-containing acetals may be hydrogenated to the corresponding glycols or polyols as disclosed in U.S. Patent 2,888,492, issued May 26, 1959 to Fischer et al. However, the hydrogenation of halogenated acetals or ketals to the corresponding halohydrin compounds presents special difficulties because an appreciable quantity of halogen is invariably replaced by hydrogen, yielding carbinol compounds without the desired halogen substituents.

It is an object of the present invention to provide a convenient process for the production of halohydrin compounds by hydrogenation of halogenated acetals or ketals under conditions which preserve the carbon-halogen bond intact. It is a further object of the present invention to provide a novel method of preparing useful halohydrin compounds. Other objects will be apparent from the following detailed description of the invention.

It has been found that these and other objects of the invention may be accomplished by the catalytic hydrogenation of halogenated acetals or ketals in the presence of a ruthenium catalyst.

The reaction of the present invention may be represented by the following equations:

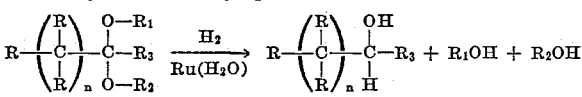

and

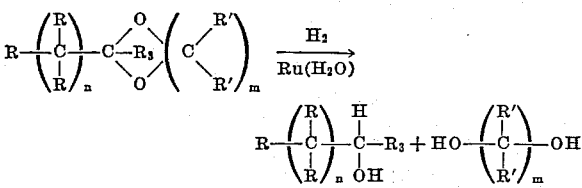

wherein at least one R is a halogen (Cl, Br, I and F) and the remaining R groups are hydrogen atoms or hydrocarbon groups of from 1 to 20 carbon atoms; each R′ is independently selected from the group consisting of hydrogen and hydrocarbon groups of from 1 to 20 carbon atoms; $R_1$ and $R_2$ are each hydrocarbon substituents of from 1 to 20 carbon atoms; $R_3$ is hydrogen in the case of an acetal and a hydrocarbon with from 1 to 20 carbon atoms in the case of a ketal; and $n$ and $m$ are each integers from 1 to 10 (and preferably from 2 to 10), inclusive.

The acetal or ketal starting materials of the present invention may be prepared in situ or they may be isolated prior to the hydrogenation step. Ordinarily it is more convenient to prepare the acetals or ketals in situ and to hydrogenate the product directly, rather than attempt to isolate the acetal or ketal prior to hydrogenation. The acetals are prepared according to conventional methods by merely reacting the alcohol (including glycols and polyols) with the corresponding halo-substituted aldehyde in the presence of a catalyst, such as an acid. Mineral acids are very suitable catalysts for this purpose. Cyclic acetals may be employed in the process of the present invention and methods for the preparation of such acetals are disclosed in U.S. 2,888,492. Ketals may be prepared by exchange reactions of the ketone with either alkyl orthoformates or alkyl sulfites in the presence of an acid. When monohalohydrins are to be prepared according to the process of the present invention, an unsaturated aldehyde (such as acrolein, crotonaldehyde, or other hydrocarbon substituted acrolein compound) may be reacted with a hydrohalogen (for example, hydrogen chloride or hydrogen bromide) in the presence of an alcohol (particularly glycols such as trimethylene glycol, tetramethylene glycol, or hexylene glycol) to simultaneously add hydrogen halide across the double bond of the aldehyde and form the halogenated acetal or halogenated cyclic acetal. This method of forming the halogenated cyclic acetal may be illustrated for the case of an alpha, beta-unsaturated aldehyde by the following reaction:

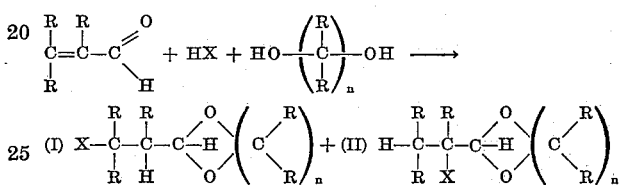

wherein X is a halogen (preferably chlorine or bromine), each R is independently selected from the group consisting of hydrogen and hydrocarbon groups with from 1 to 10 carbon atoms, and $n$ is a positive integer of from 2 to 10, inclusive, it being understood that the main acetal product formed is (I). This reaction may also be carried out with monohydric alcohols according to the following reaction which uses acrolein as the starting material:

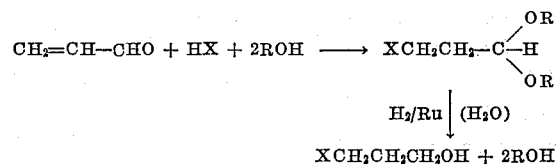

wherein X is a halogen (preferably bromine or chlorine) and R is a hydrocarbon group of from 1 to 10 carbon atoms and preferably an alkyl group of from 1 to 6 carbon atoms such as methyl, ethyl, isopropyl, n-propyl, n-butyl, sec-butyl, isobutyl, tert-butyl, pentyl, hexyl, and the isomeric and the isomeric pentyl and hexyl groups. Trimethylene bromohydrin and trimethylene chlorohydrin are examples of specific compounds which may be prepared according to this particular embodiment of the process of the present invention.

The hydrogenation step of the present invention is carried out at temperatures of from about 15° C. to 150° C. with hydrogen pressures of from atmospheric pressure to 3000 p.s.i.g. Higher hydrogen pressures may be employed, but no technical advantage is obtained thereby. The ketals may be conveniently hydrogenated at room temperature. Temperatures of from 50° C. to 110 C. are suitable for both acetals and ketals when using hydrogen pressures of from atmospheric to 3500 p.s.i.g. When cyclic acetals are hydrogenated, temperatures of from 70° C. to 120° C. may be used. Under these conditions, hydrogenation is generally complete in from 2 to 28 hours. If less than 90% yields of halohydrin are acceptable, the hydrogenation may be stopped earlier and hydrogenation periods of from 1 to 10 hours will be sufficient. Very high temperatures are generally undesirable and lead to decomposition of the products formed.

The catalyst which is employed in the hydrogenation step of the present invention is ruthenium or a ruthenium-containing mixture or alloy. The ruthenium metal or alloy is preferably in finely divided form and may be supported by conventional materials such as charcoal, pure carbon, alumina, clay or other well-known support materials. The effect or ruthenium as a catalyst in the present invention is quite surprising, since closely analogous transition metals (for example, palladium and rhodium) do not operate in the same manner as ruthenium and tend to promote replacement of the halogen atoms with hydrogen atoms with the corresponding elimination of hydrogen halide. As can be readily seen, this reaction prevents the formation of the desired halohydrin compounds which are produced according to the process of the present invention. Only a catalytic amount of ruthenium is necessary in the process of the present invention. Ordinarily, amounts of up to 25% by weight of the total reaction mixture may be used. About .01 to 10% by weight is usually sufficient to obtain excellent yields of halohydrin compounds. Trace amounts (from 0.001 to 0.1 gram per 10 grams of acetal) of acid materials, preferably alkyl benzene sulfonic acids (such as p-toluenesulfonic acid), may be added to the reaction mixture for pH control.

While halogenated compounds such as chloroacetaldehyde may be converted to ethylene chlorohydrin according to the process of the present invention, the yields obtained are considerably lower than the yields obtained from halogenated carbonyl compounds in which the halo moiety is at least one carbon atom removed from the carbonyl group. Thus, the preferred class of starting materials which are hydrogenated according to the process of the present invention are carbonyl compounds in which the halogen atoms are attached to the beta carbon atom (with respect to the carbonyl group) or are even further removed from the carbonyl group. The higher the number of carbon atoms which separate the halogen atoms from the carbonyl groups, the easier it is to reduce the carbonyl groups without cleavage of the halogen-carbon bond of the molecule and accompanying splitting-out of hydrogen halide.

Halogenated ketones may also be hydrogenated to the corresponding halo-substituted alkanols by using a ruthenium catalyst according to the present invention, either with or without prior formation of the ketal. Thus, halogenated ketones of from 3 to 15 carbon atoms and at least one halogen atom (preferably chlorine and/or bromine) may be hydrogenated in the presence of a ruthenium catalyst (such as 5% ruthenium on carbon). The hydrogenation is carried out at temperatures above about 18° C. (preferably at from 40° C. to 80° C.) under either atmospheric or superatmospheric pressure of hydrogen. Hydrogen pressures of from 50 p.s.i.g. to 3000 p.s.i.g. are particularly suitable.

A convenient method of conducting one embodiment of the process of the present invention comprises reacting acrolein (or a substituted acrolein compound), hydrogen halide (such as hydrogen chloride or hydrogen bromide), and an alcohol containing at least one hydroxyl group (preferably alkanols and glycols with from 1 to 12 carbon atoms and composed entirely of carbon, hydrogen and oxygen atoms) to form the corresponding acetal (including cyclic acetals) of beta-halopropionaldehyde (or substituted beta-halopropionaldehyde). The acetal is then hydrogenated in situ in the presence of from 0.5 to 25% by weight of $H_2O$ based on the total weight of the reaction mixture by contacting the acetal reaction product with molecular hydrogen under a superatmospheric pressure (from 1 to 100 atmospheres) at a temperature of from 15° C. to 150° C. (preferably from 70° C. to 110° C.) in the presence of a catalytic amount of ruthenium catalyst for a period of time sufficient to substantially completely reduce the aldehyde group to the methylol group without cleavage of the halogen atoms. At least one mole equivalent of water is sufficient per mole of acetal.

The preferred olefinic aldehydes are alpha,beta-olefinic aldehydes of the formula:

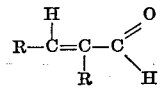

wherein each R is selected from the group consisting of hydrogen and hydrocarbon radicals of from 1 to 6 carbon atoms. Examples of such compounds include crotonaldehyde, methacrolein, 2-ethyl acrolein, 2-butylacrolein, 2-isopentylacrolein, 2-neopentylacrolein, 2-phenylacrolein, cinnamaldehyde, and 3-cyclohexylacrolein. Substituted acrolein compounds wherein each R is selected from the group consisting of hydrogen and an alkyl group of from 1 to 6 carbon atoms (preferably a lower alkyl group of from 1 to 4 carbon atoms) may be used. Alkanols such as methanol, ethanol, n-propanol, isopropanol, n-butanol and the isomeric butanols as well as pentanols, hexanols, heptanols, octanols, decanols, dodecanols and in general monohydric alcohols with from 1 to 12 carbon atoms may be employed. Lower alkanols (1 to 4 carbon atoms) are preferred monohydric, acetal-forming alcohols. Glycols such as ethylene glycol, propylene glycol, butylene glycols, and in general polymethylene glycols of the formula $HO(CH_2)_nOH$ wherein $n$ is a positive integer of from 2 to 12 carbon atoms may be employed. Other polyhydric alcohols may be used such as polyhydric compounds of the formula:

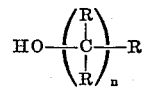

wherein $n$ is a positive integer of from 2 to 12, at least one R group is a hydroxyl group, and the remaining R groups are selected from the group consisting of the hydrogen atom and a lower alkyl group (1–4 carbon atoms) such as methyl, ethyl, n-propyl, isopropyl, n-butyl, isobutyl, sec-butyl, and tertiary butyl. Preferred glycols of this formula are those with from 2 to 24 total carbon atoms in which exactly one R group is a hydroxyl group and the remainder of the R groups are selected from the group consisting of hydrogen and lower alkyl groups, $n$ being a positive integer of from 3 to 12. Ordinarily, the hydrogenation reaction is conducted under slightly acidic conditions (from a pH of 4.5 to just below 7.0). The acidity of the acetal product may be readjusted prior to hydrogenation if necessary, or may be controlled by the addition of a stoichiometric amount of hydrogen halide during the acetal-forming step. In addition, a minor amount of a hydrolysis catalyst (such as p-toluenesulfonic acid) may be used to aid in pH control. Generally, from 0.001% to about 2.0% by weight based on the total weight of the reaction mixture may be employed for pH control.

The process of the present invention may be operated continuously or batchwise. In a continuous process the diol produced in the hydrogenation step is recycled to continuously form fresh acetal. For example, trimethylene chlorohydrin may be conveniently prepared in a continuous process by (1) reacting approximately equimolar amounts (±10%) of acrolein, hydrogen halide (suitably hydrogen chloride), and a diol such as 1,3-butanediol to form the 1,3-butanediol acetal of beta-chloropropionaldehyde, (2) hydrogenation of the acetal in the presence of a ruthenium catalyst (preferably ruthenium on carbon) and a trace of an acid such as toluene sulfonic acid to form trimethylene chlorohydrin and release 1,3-butanediol, and (3) recovery of the product trimethylene chlorohydrin, and of 1,3-butanediol for recycle. Any suitable method of product recovery may be employed. Vacuum distillation is one convenient method of recovering the trimethylene halohydrin.

The acetals are hydrogenated in the presence of water, one mole equivalent per mole of acetal being sufficient to accomplish the reaction. More water may be used if desired. The water may be added to the reaction mixture directly or formed in situ by either side reactions which may eliminate water or direct combination of hydrogen and oxygen to form water.

The following examples are submitted for the purpose of illustration only and are not to be construed as limiting the scope of the invention in any way.

*Example I*

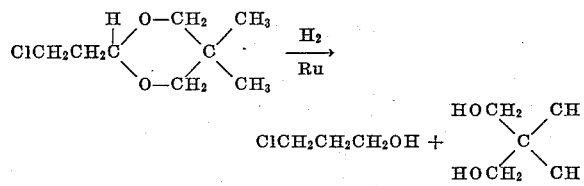

A mixture of 10.6 grams of the cyclic acetal of beta-chloropropionaldehyde and neopentylene glycol (prepared in 92% yield from HCl, acrolein, and neopentylene glycol), 2.2 grams of $H_2O$, 0.05 gram of para-toluenesulfonic acid (hydrolysis catalyst), and 1.1 grams of 5% Ru-C catalyst was hydrogenated at 1000 p.s.i.g. hydrogen pressure at 90° C. The theoretical amount of hydrogen was taken up in 11 hours. Gas-liquid chromatographic analysis indicated a 94% yield of trimethylene chlorohydrin and a 99% recovery of the neopentylene glycol (2,2-dimethyl-1,3-propanediol). The reaction mixture was filtered, treated with $Ca(OH)_2$, filtered again, and distilled giving trimethylene chlorohydrin ($n_D^{25}$ 1.4425) with an infrared spectrum identical with an authentic sample.

*Example II*

Example I was repeated with a higher hydrogenation temperature. A mixture of 21.3 grams of the cyclic acetal of beta-chloropropionaldehyde and 2,2-dimethyl-1,3-propanediol (prepared in 92% yield from HCl, acrolein, and 2,2-dimethyl-1,3-propanediol), 2.2 grams of $H_2O$, 0.1 gram p-toluenesulfonic acid, and 2.2 grams of 5% Ru-C catalyst was hydrogenated at 1000 p.s.i.g. hydrogen pressure at 102° C. for ten hours. Gas-liquid chromatographic analysis of the hydrogenation product indicated a 53% yield of trimethylene chlorohydrin. Neopentylene glycol (2,2-dimethyl-1,3-propanediol) was regenerated in 87% yield. Titration of the reaction mixture showed 29% free HCl. Gas-liquid chromatographic analysis indicated the presence of propanol and 2-methylbutanol.

*Example III*

Example I was repeated using 10.7 grams of the cyclic acetal of beta-chloropropionaldehyde and 2,2-dimethyl-1,3-propanediol, 2.2 grams of $H_2O$, 7.9 grams of ethyl alcohol, and 0.8 gram of 5% Ru-C catalyst. The mixture was pressured to 1000 p.s.i.g. with hydrogen at 90° C. for 12 hours. Gas-liquid chromatographic analysis of the product indicated 98% trimethylene chlorohydrin and regeneration of 92% of the theoretical amount of neopentylene glycol. The reaction mixture was neutralized with a small quantity of $NaHCO_3$, filtered, and fractionally distilled to give 3.7 grams of trimethylene chlorohydrin and 4.3 grams of neopentylene glycol.

*Example IV*

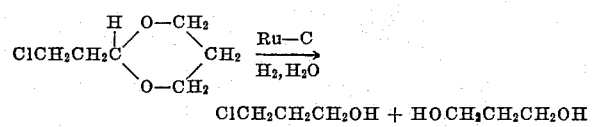

A mixture of 12.5 grams of the cyclic acetal of beta-chloropropionaldehyde and trimethylene glycol, 0.04 gram of p-toluenesulfonic acid, and 0.9 gram of 5% Ru-C catalyst in 2.7 grams of water was heated at 90° C. under 1000 p.s.i.g. hydrogen pressure for three hours. Gas-liquid chromatographic analysis of the product indicated 100% conversion to trimethylene chlorohydrin and trimethylene glycol. The mixture of reaction products was treated with a small quantity of $Na_2CO_3$ and filtered. Fractional distillation gave 6.95 grams of trimethylene chlorohydrin (88% yield) and 6.06 grams of trimethylene glycol (95% yield). Both products were identified by comparison of the infrared spectra with the spectra of authentic samples.

*Example V*

In this example, the amounts of reactants were scaled up by a factor of about 10.

A mixture of 126.2 grams of the cyclic acetal of beta-chloropropionaldehyde and neopentylene glycol, 0.4 gram of para-toluenesulfonic acid, and 5.1 grams of 5% Ru-C catalyst in 25.1 grams of water was heated at 95° C. for 20 hours under a hydrogen pressure of 1000 p.s.i.g., to give a mixture containing 40 grams of trimethylene chlorohydrin and 55 grams of neopentylene glycol. Distillation of the reaction mixture (after addition of $Na_2CO_3$) under reduced pressure gave 37 grams of trimethylene chlorohydrin and 53 grams of neopentylene glycol.

Repetition of the reaction at 85° C. with regenerated catalyst (washed with $H_2O$, ethyl alcohol, pentane, and then dried in vacuo) gave yields of 100% of trimethylene chlorohydrin and neopentylene glycol (based on gas-liquid chromatographic analysis), indicating that no poisoning of the catalyst occurred.

*Example VI*

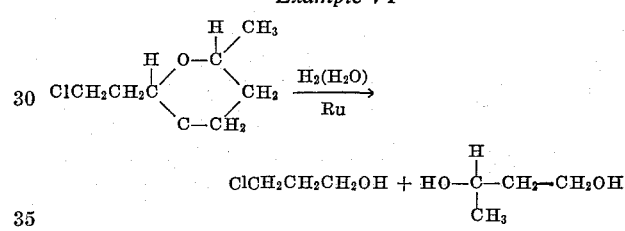

A mixture of 11.0 grams of the cyclic acetal of beta-chloropropionaldehyde and 1,3-butanediol, 0.05 gram of p-toluene-sulfonic acid, and 1.2 grams of 5% Ru-C catalyst in 1.9 grams of $H_2O$ was hydrogenated at 1000 p.s.i.g. hydrogen pressure at 90° C. for a period of 14 hours. Gas-liquid chromatographic analysis indicated a 97% yield of trimethylene chlorohydrin and a 95% yield of 1,3-butanediol.

*Example VII*

In this example, trimethylene chlorohydrin is prepared from acrolein in a one-step reaction according to the equation:

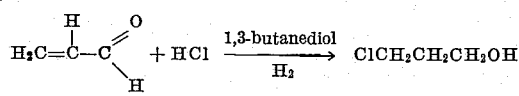

A mixture of 10 ml. of acrolein (8.41 grams) and 14.4 grams of 1,3-butanediol cooled to −15° C. was reacted with 5.9 grams of HCl by bubbling the HCl into the mixture over a period of one hour. The reaction mixture separated into two phases and gas-liquid chromatographic analysis indicated that the cyclic acetal had formed in good yield. The reaction mixture was neutralized with aqueous NaOH and dilute HCl added until the mixture was slightly acid (pH ~5). The upper layer containing the cyclic acetal:

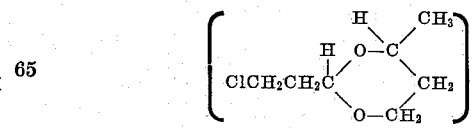

weighed 23.3 grams ($n_D^{25}$=1.4583). A trace of p-toluenesulfonic acid was added to the cyclic acetal-containing reaction mixture along with one gram of 5% Ru-C catalyst. The mixture was then heated to 88° C. for ten hours under a hydrogen pressure of 1000 p.s.i.g. Gas-liquid chromatographic analysis indicated a 75% yield of trimethylene chlorohydrin and a 77% yield of 1,3-butanediol. No other products were detected.

This experiment was repeated without the transfer of the reaction mixture from vessel to vessel, in order to eliminate any mechanical losses of product. An 81% yield of trimethylene chlorohydrin and a 93% recovery of 1,3-butanediol was obtained.

*Example VIII*

In order to demonstrate the effect of acetalization, one hydrogenation experiment was carried out with chloroacetaldehyde and another hydrogenation was completed using the diethyl acetal of chloroacetaldehyde. The results were as follows:

(A) A solution of 12.0 grams of 40% by weight of chloroacetaldehyde in water was hydrogenated in the presence of 1.0 gram of 5% Ru-C catalyst for three hours at a temperature of 40° C. under a hydrogen pressure of 1000 p.s.i.g. The yield of products (determined by gas-liquid chromatographic analysis) were: 73% ethyl alcohol and 14% ethylene chlorohydrin.

(B) 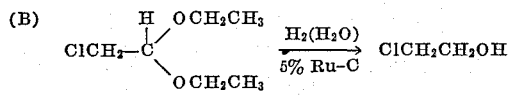

A mixture of 10.1 grams of the acetal of chloroacetaldehyde and ethanol, a trace of p-toluenesulfonic acid, 1.0 gram of 5% Ru-C, and 1.4 grams of water were heated to 50° C. under 1000 p.s.i.g. hydrogen pressure for 18 hours. Gas-liquid chromatographic analysis gave the following results:

|  | Percent |
|---|---|
| $ClCH_2CH_2OH$ | 25 |
| $CH_3CH_2OH$ | 39 |

*Example IX*

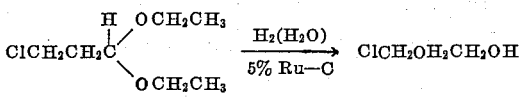

A 10-gram sample of the diethyl acetal of 3-chloropropionaldehyde in 1 mole equivalent of water was hydrogenated in the presence of 1.0 gram of 5% Ru-C catalyst and a trace of p-toluenesulfonic acid at 50° C. for four hours at 1000 p.s.i.g. of hydrogen pressure. One mole equivalent of hydrogen was taken up. Gas-liquid chromatographic analysis indicated a 96% yield of trimethylene chlorohydrin ($ClCH_2CH_2CH_2OH$). Distillation of the reaction mixture gave trimethylene chlorohydrin ($n_D^{25}$ 1.4385) with an infrared spectrum identical with an authentic sample of trimethylene chlorohydrin. Gas chromatographic analysis indicated the material had a purity greater than 95%.

Repetition of this experiment using an equal amount of 5% Pd-C catalyst in place of the ruthenium catalyst produced no trimethylene chlorohydrin. Gas-liquid chromatographic analysis indicated that the product was mainly propyl chloride.

*Example X*

In this experiment a rhodium catalyst was substituted for ruthenium.

A 10.8-gram sample of the cyclic acetal of beta-chloropropionaldehyde and 1,3-butanediol was mixed with 2.1 grams of $H_2O$, 1.0 gram of a 5% rhodium-carbon catalyst, and a trace of paratoluenesulfonic acid. The mixture was hydrogenated at 90° C. and 1000 p.s.i.g. hydrogen pressure for nineteen hours. During this time, two mole equivalents of hydrogen were taken up. Titration of an aliquot of the reaction product showed that 51% of the theoretical amount of hydrogen chloride had been liberated, indicating extensive cleavage of the chlorine-carbon bonds. Gas-liquid chromatographic analysis showed the formation of large quantities of n-propanol as well as several other compounds which were not identified. No appreciable amount of trimethylene chlorohydrin was found.

*Example XI*

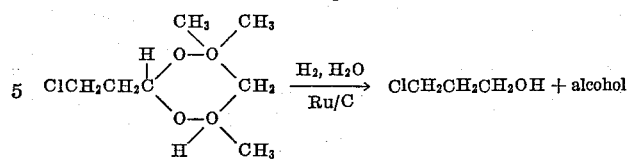

A mixture of 10.1 grams of the cyclic acetal of beta-chloropropionaldehyde and hexylene glycol, 0.9 gram of 5% Ru-C hydrogenation catalyst, and a trace of p-toluenesulfonic acid was placed in a hydrogenation vessel with from 1 to 2 grams of water. The vessel was pressured to 1000 p.s.i.g. with hydrogen and held at 100° C. Hydrogenation was complete in ten hours (2 mole equivalents of hydrogen were absorbed). Gas-liquid chromatographic analysis indicated that trimethylene chlorohydrin was formed in 98.5% yield. The hexylene glycol formed in the reaction broke down into a mixture of products (mainly monohydric alcohol).

*Example XII*

A 10-gram sample of the diethyl acetal of 3-chloropropionaldehyde was hydrogenated in the presence of 1.0 gram of 5% Ru-C catalyst and a trace of para-toluenesulfonic acid at 60° C. No water was added to the acetal (compare with Example IX). Gas-liquid chromatographic analysis indicated only a 6% yield of the desired product (trimethylene chlorohydrin) and a large amount of propyl chloride.

I claim as my invention:

1. A process for preparing a halohydrin from a halo-substituted compound of the formula

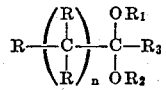

wherein at least one R represents halogen; the remaining R's are $R_3$ are members selected from the group consisting of hydrogen and hydrocarbon groups of 1 to 20 carbon atoms, $R_1$ and $R_2$ are each hydrocarbon groups of 1 to 20 carbon atoms and $n$ is an integer from 1 to 10 which comprises, contacting said halo-substituted compound with molecular hydrogen at about 15° to 150° C. and atmospheric to about 3,500 p.s.i.g. pressure in the presence of water at pH about 4.5 to just below 7.0 and a ruthenium metal catalyst in a catalytic amount of at least about 0.01% weight of the reaction mixture.

2. A process for preparing a halohydrin from a halo-substituted compound of the formula

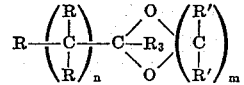

wherein at least one R represents halogen, each remaining R,R' and $R_3$ is a member selected from the group consisting of hydrogen and hydrocarbon groups of 1 to 20 carbon atoms, and $m$ is an integer from 1 to 10 which comprises, contacting said halo-substituted compound with molecular hydrogen at about 15° to 150° C. and atmospheric to about 3,500 p.s.i.g. pressure in the presence of water at pH about 4.5 to just below 7.0 and a ruthenium metal catalyst in a catalytic amount of at least about 0.01% weight of the reaction mixture.

3. A process for preparing a halohydrin from a beta-halo-alkano acetal produced by reacting an aldehyde of the formula

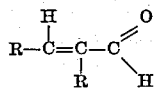

wherein each R is selected from the group consisting of hydrogen and alkyl groups of 1 to 6 carbon atoms and an unsubstituted alkanol of 1 to 12 carbon atoms in the presence of hydrogen halide which comprises, reacting said beta-halo-substituted acetal with molecular hydrogen at about 15° to 150° C. and atmospheric to about 3,500 p.s.i.g. pressure in the presence of water at pH about 4.5 to just below 7.0 and a ruthenium metal catalyst in a catalytic amount of at least about 0.01% weight of the reaction mixture.

4. A process for preparing a halohydrin from a beta-halo-alkano cyclic acetal produced by reacting an aldehyde of the formula

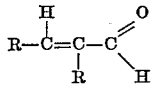

wherein each R is selected from the group consisting of hydrogen and alkyl groups of 1 to 6 carbon atoms and an unsubstituted glycol having 2 to 24 carbon atoms of the formula

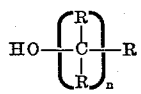

wherein $n$ is a positive integer of from 2 to 12, one R represents a hydroxyl group, and the remaining R's are selected from the group consisting of hydrogen and lower alkyl groups of 1 to 4 carbon atoms in the presence of hydrogen halide which comprises, reacting said beta-halo-substituted cyclic acetal with molecular hydrogen at about 15° to 150° C. and atmospheric to about 3,500 p.s.i.g. pressure in the presence of water at pH about 4.5 to just below 7.0 and a ruthenium metal catalyst in a catalytic amount of at least about 0.01% weight of the reaction mixture.

5. A process for preparing trimethylene halohydrin which comprises:
(1) reacting acrolein, hydrogen halide, and a saturated, aliphatic alcohol of 1 to 12 carbon atoms, composed entirely of carbon, hydrogen and at least one hydroxyl group to form the acetal of beta-halopropionaldehyde, and
(2) contacting said acetal of beta-halopropionaldehyde with molecular hydrogen under at least atmospheric pressure in the presence of water using acid conditions and a catalytic amount of ruthenium metal at a temperature of from 15° C. to 150° C. to form trimethylene halohydrin.

6. The process of claim 5 wherein the alcohol is ethanol.

7. A process for preparing trimethylene chlorohydrin which comprises
reacting the cyclic acetal of beta-chloro-propionaldehyde and a glycol of 2 to 24 carbon atoms having the formula

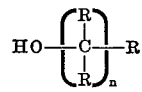

wherein $n$ is a positive integer of from 2 to 12, one R represents a hydroxyl group, and the remaining R's are selected from the group consisting of hydrogen and lower alkyl groups of 1 to 4 carbon atoms, with molecular hydrogen at about 15° to 150° C. and atmospheric to about 3,500 p.s.i.g. pressure in the presence of water at pH about 4.5 to just below 7.0 and a ruthenium metal catalyst in a catalytic amount of at least about 0.01% weight of the reaction mixture.

8. The process of claim 7 wherein the alcohol is a glycol of from 2 to 12 carbon atoms.

9. The process of claim 7 wherein the alcohol is 1,3-butanediol.

10. The process of claim 7 wherein the alcohol is neopentylene glycol.

References Cited by the Examiner
UNITED STATES PATENTS 2,825,743  3/1958  MacLean _____ 260—638
2,888,492  5/1959  Fisher _____ 260—635

LEON ZITVER, *Primary Examiner.*

M. B. ROBERTO. G. A. MILWICK. *Assistant Examiners.*